Jan. 5, 1937.  F. C. BEST  2,066,553
MOTOR VEHICLE
Filed Dec. 20, 1933   2 Sheets-Sheet 1

Inventor
Frank C. Best,
By Watson Coit Morse
& Grindle
Attorney

Jan. 5, 1937.  F. C. BEST  2,066,553
MOTOR VEHICLE
Filed Dec. 20, 1933  2 Sheets-Sheet 2
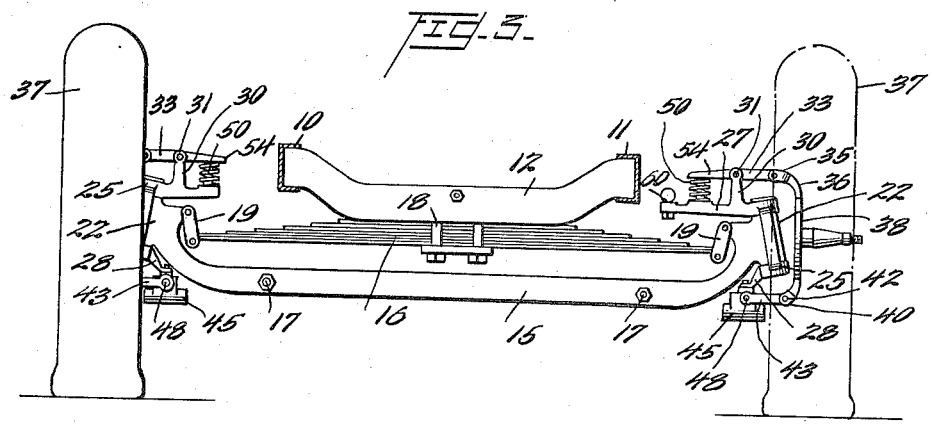
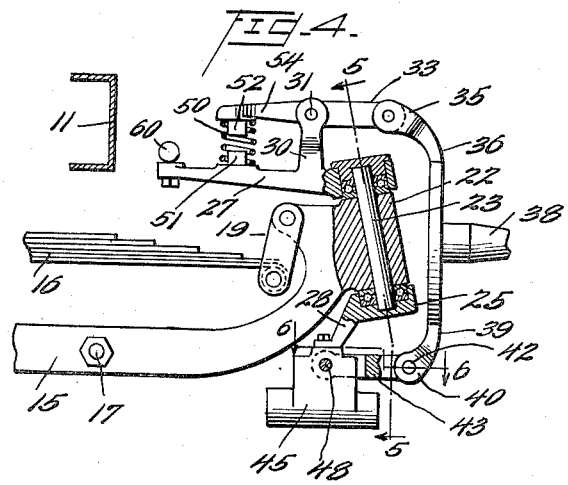
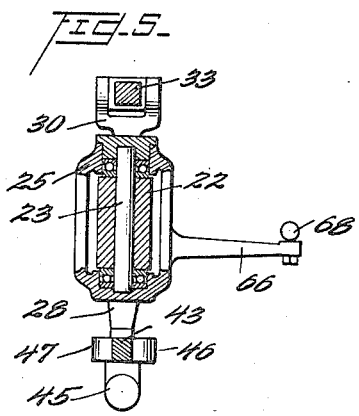
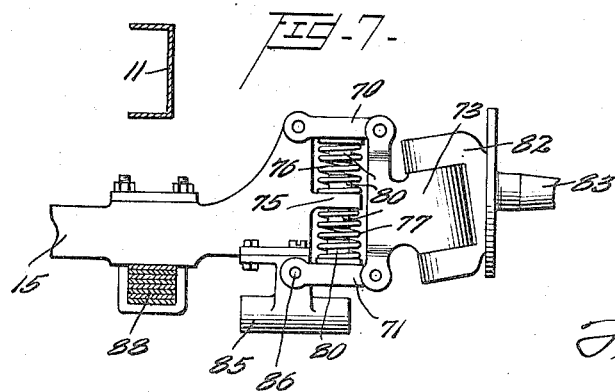
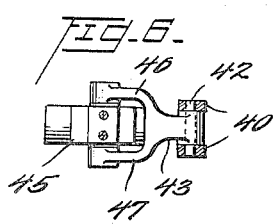
Inventor
Frank C. Best,
By Watson, Coit, Morse
& Grindle
Attorney Patented Jan. 5, 1937

2,066,553

UNITED STATES PATENT OFFICE 2,066,553

MOTOR VEHICLE

Frank C. Best, Detroit, Mich., assignor to Packard Motor Car Company, Detroit, Mich., a corporation of Michigan Application December 20, 1933, Serial No. 703,308

4 Claims. (Cl. 280—124)

This invention relates to motor vehicles and more particularly to wheel suspensions for motor vehicles. It is an object of the invention to provide a wheel suspension which is relatively light and simple and which combines the advantages of both the independent type of wheel suspension and the conventional suspension employing the usual axle.

Considerable difficulty has been experienced in adapting the principles of independent wheel suspension, long employed in European constructions, to the faster and generally heavier vehicles and to the road conditions which obtain in this country. One of the principal difficulties has arisen from the extreme flexibility of the independent type of wheel suspension. For instance, on rounding a turn at high speed the tendency of the vehicle body and frame to lean outwardly is increased by the employment of separate suspension systems for the wheels, particularly where such systems involve the provision of coil springs for yieldingly resisting movement of the wheels, the coil spring being ordinarily less resistant to flexure than the leaf spring and developing no friction, thereby offering less resistance to rising and falling movement of the wheels with respect to the vehicle frame. On the other hand, road conditions in this country are uniformly excellent and it is seldom that extremely rough roads are encountered, so that extreme flexure of motor vehicle springs seldom occurs except when the vehicle is rounding a curve.

It is therefore proposed as a part of the present invention to provide a wheel suspension in which the effect and advantages of independent springing are superimposed on the effect produced by the use of wheel suspensions of the type now considered conventional in this country. More specifically, it is an object of the invention to provide a motor vehicle wheel suspension employing a conventional axle and leaf spring construction and to support the road wheels for independent rising and falling movement with respect to the axle, such movement being preferably resisted by coil springs. With such an arrangement the usual leaf spring assembly, offering as it does high frictional resistance to flexure, stabilizes the vehicle and prevents excessive side sway. At the same time ease of riding is secured on reasonably good roads by reason of the fact that the independent springing of the wheels permits limited movement thereof as minor irregularities in the road bed are encountered, without affecting the position of the axle with respect to the frame.

The invention is particularly applicable to the steerable road wheels of the vehicle and has been so illustrated in the drawings, although it will be understood that certain features of the invention are equally applicable to the suspension of road wheels which are not steerable.

Further objects and features will be apparent from the specification and the accompanying drawings, in which:

Figure 3 is a transverse sectional view taken substantially on the line 3—3 of Figure 1;

Figure 4 is an enlarged view illustrating a portion of the construction shown in Figure 3 with certain of the parts shown in section;

Figure 5 is a section on the line 5—5 of Figure 4;

Figure 6 is a section on the line 6—6 of Figure 4; and

Figure 7 is a fragmentary sectional view corresponding to Figure 4 but illustrating a modified form of the invention.

Figure 1:
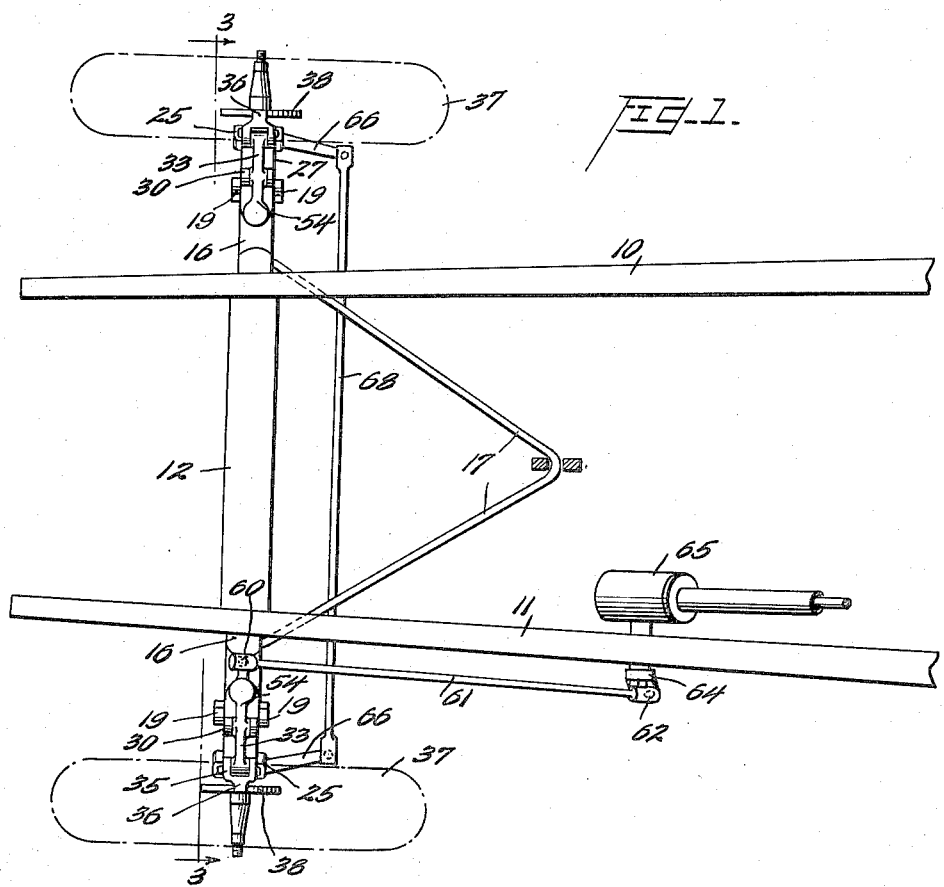
Figure 1 is a plan view of part of a motor vehicle chassis in which the present invention is employed.

In describing the invention reference will be made to the preferred form thereof as shown in the drawings and specific language will be used to describe the several parts of the construction in order to facilitate an understanding of the invention. It will nevertheless be understood that no restriction of the scope of the invention is thereby intended and that various changes and alterations are contemplated such as would be apparent to one skilled in the art to which the invention relates.

Figure 2:
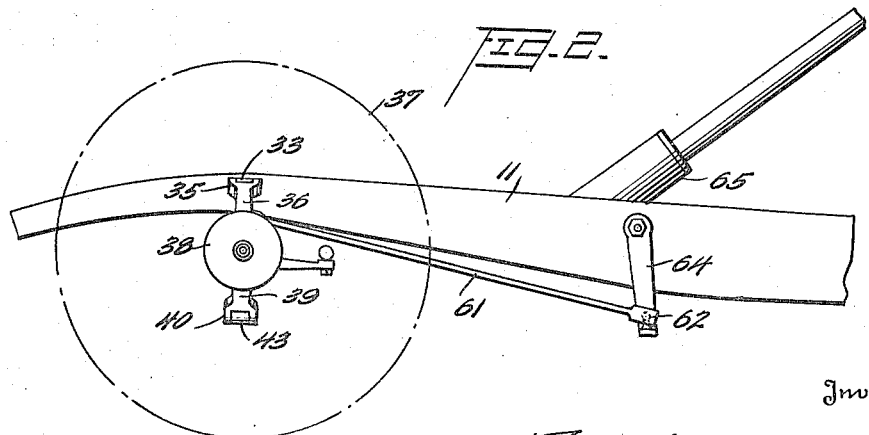
Figure 2 is a side elevation of the construction shown in Figure 1.

The invention is shown as applied to a conventional motor vehicle frame comprising the side frame members 10 and 11 and the cross frame member 12, the latter extending between and being secured to the side frame members. In the form of the invention illustrated in Figures 1 to 6, inclusive, of the drawings, a conventional transverse axle 15 is employed, this axle being yieldingly supported from the frame by means of a leaf spring assembly 16 which is secured to the cross frame member 12 adjacent the central portion of the latter as indicated at 18, spring shackles 19 serving to connect the spring assembly with the axle. Radius rods 17, pivotally connected to the frame and the axle may be employed to reduce the stresses applied to the spring assembly. The axle is formed at each end with a boss 22 receiving a king pin 23 and a steering knuckle 25 is associated with each end of the axle and is supported for steering movement thereon about the axis of the king pin 23 in any conventional manner. Since the construction is identical at the two sides of the vehicle, reference will be made to the elements at one side thereof only in order to simplify the description.

Each steering knuckle 25 may be of substantially yoke shaped form, as shown more particularly in Figure 5 of the drawings, and is provided with upper and lower arms 27 and 28 respectively, these arms being rigid with the body of the knuckle and being either integral therewith or rigidly secured thereto. Any other conventional method of mounting the steering knuckle 25 and the associated arms 27 and 28 on the end of the axle 15 may be employed, the details of the construction shown in the drawings forming no essential part of the present invention.

The arm 27 is provided with an upstanding yoke shaped member 30 which affords a pivotal support about an axis 31 for an upper wheel supporting link 33, the latter being in turn pivotally connected with the yoke shaped portion 35 of an arm 36 formed integrally with or secured rigidly to the conventional wheel spindle member 38 which carries the road wheel 37. A depending arm 39, likewise rigid with the wheel spindle 38, is provided with a yoke shaped portion 40 in which a lower wheel supporting link 43 is received for pivotal movement about an axis 42. Link 43 is forked to provide arms 46 and 47 as shown in Figure 6 of the drawings, these arms embracing a shock absorber housing 45, the latter being carried by and rigidly secured to the knuckle arm 28. The arms 46 and 47 of the link 43 are secured rigidly to the respective ends of a shaft 48 which extends through and is supported for rocking movement in the upper portion of the shock absorber housing 45 and which is operatively connected to mechanism within the housing. This shock absorbing mechanism is preferably of the well-known hydraulic type, it being understood that as the shaft 48 is rocked, movement of fluid within the housing 45 through more or less restricted passages is effected.

The steering knuckle arm 27 is provided with a suitable spring seat receiving a coil spring 50, a spring guide 51, functioning also as an abutment, extending within the coil spring and retaining the latter in position. A similar spring guide and abutment 52 is associated with an opposed spring seat formed on an inwardly directed extension 54 of the wheel supporting link 33 whereby upward movement of the outer end of the link 33 is resisted by compression of the spring 50 and such movement is further limited by the engagement of the abutments 51 and 52.

The function of the wheel suspension will be readily understood from the foregoing description. As either road wheel 37 rises and falls in passing over an irregular surface, the links 33 and 43 will swing upwardly and downwardly about the pivotal axis 31 and the axis of the shaft 48 respectively, the coil spring 50 yieldingly resisting this movement and the shock absorbing mechanism within the housing 45 acting to damp the movement in the conventional manner. Unless a rough road is encountered, the movement thus permitted is sufficient and the leaf spring 16 will be subjected to little or no flexure. However, when the vehicle is rounding a curve at high speed, the upward movement of the outer wheel, to which most of the load is transferred, is limited by engagement of the abutments 51 and 52 and any additional relative movement of the wheel and frame which may be required will flex the leaf spring 16, the latter offering much greater resistance to such relative movement and tending to prevent excessive side sway of the vehicle frame and body. Flexing of the leaf spring assembly similarly occurs when rough roads are encountered. Steering of the vehicle may be effected in the usual manner without affecting the operation of the wheel suspension, the wheel supporting links, the associated coil springs, and the shock absorbing devices executing swinging steering movement with the road wheel.

Since the knuckle 25 and the associated parts including the arm 27 partake of no rising and falling movement, conventional steering mechanism may be employed such as is commonly used with any rigid axle construction. Thus the arm 27 may be extended inwardly and provided with an articulated connection as at 60 with a steering drag link 61, the latter being pivoted as at 62 to a steering drop arm 64 operable from gearing within the usual steering housing 65. Arms 66 extending rearwardly from and preferably formed integrally with each steering knuckle 25 as shown more particularly in Figure 5 of the drawings, are connected by means of a cross tie rod 68 having an articulated connection with each arm to ensure conjoint steering movement of the two road wheels in the conventional manner.

Referring now to the form of the invention shown in Figure 7 of the drawings it will be observed that this construction differs principally from that heretofore described in the location of the steering connection between the road wheel assembly and the axle, the steering knuckle being interposed in the second form of the invention between the wheel supporting links and the road wheel assembly rather than between the axle and the wheel supporting links. Thus upper and lower wheel supporting links 70 and 71 are pivotally connected at each end to the axle 15 and to the wheel carrying member 73, the member 73 rising and falling with respect to the axle in a manner which will be understood from the description of the first described form of the invention. The axle 15 in the second modification is preferably provided with a laterally extending lug 75 and coil springs 76 and 77 are interposed under compression between this lug and the respective wheel supporting links 70 and 71, abutments 80 provided on the opposing spring seats affording guides for the springs and also serving to limit both upward and downward movement of the links with respect to the axle 15.

A steering knuckle 82 formed rigidly with or secured to the wheel spindle 83 is pivoted for steering movement on the wheel carrying member 73 in any convenient manner, for instance, that illustrated more particularly in connection with the first form of the invention.

A shock absorber housing 85 having a shaft 86 extending exteriorly thereof on either side affords a fulcrum for the inner end of the link 71, this housing being secured rigidly to the axle 15, so that rising and falling movement of the road wheel with respect to the axle is effectively damped. The yielding mounting for the axle 15 in this form of the invention is afforded by longitudinally extending leaf spring assemblies 88 at each side of the vehicle, the springs being secured to the axle as shown in Figure 7 and to the frame in any conventional manner. While steering mechanism is not illustrated in the drawings as applied to this form of the invention, mechanism similar to that shown in Figures 1 and 2 may be employed, the steering knuckles 82 at opposite sides of the vehicle being connected for conjoint steering movement with each other and operated from the usual steering column. Since the independent movement of the road wheels is relatively slight, the use of conventional steering mechanism is not in the least impracticable.

From the foregoing description it will be apparent that the present invention provides a wheel suspension having adequate resistance to body sway which is at the same time unusually responsive to minor irregularities in the road bed, the coil springs employed in the preferred form of the invention being characterized by complete absence of static friction so that there is no tendency on encountering small obstructions to transmit the upward movement of the wheels to the vehicle frame and body.

In the drawings the pivotal axes for the wheel supporting links are shown as substantially parallel with each other and with a horizontal plane and the links themselves are illustrated as of substantially the same length and as extending substantially horizontally in the normal or mid position thereof in which they are shown. It will nevertheless be understood that the pivotal axes of the links may be inclined with respect to the horizontal and also with respect to a vertical longitudinal plane passing through the center line of the vehicle. Again, it may be desired to employ links of different lengths or to dispose the links in other than parallel planes in order to secure some particular movement of the road wheel. Thus it is not intended that the invention shall be limited in these respects by the present disclosure in which a simple form of the invention has been shown to facilitate an understanding thereof.

It is furthermore quite apparent that the invention can be applied equally as well to the rear road wheels of the vehicle or to road wheels which are not steerable, it being only necessary to eliminate the pivotal steering connection shown in each of the forms of the invention and to effect direct pivotal connection between the wheel supporting links and both the vehicle axle and the wheel spindle. In either application of the invention the advantages of independent wheel suspension and of conventional rigid axle suspension are secured.

Having thus described the invention, what is claimed as new and desired to be secured by Letters Patent is:

1. In a motor vehicle, the combination with a vehicle frame, of an axle, means yieldingly supporting said frame on said axle, road wheels disposed adjacent opposite ends of the axle, and means supporting each road wheel on said axle for limited rising and falling movement with respect thereto, said means comprising a steering knuckle carrying each road wheel for swinging steering movement, and links pivoted to each knuckle and axle on parallel substantially horizontal axes, and shock absorbing devices carried by said axle, each shock absorbing device affording a fulcrum for and being operatively connected with one of the links of a pair.

2. In a motor vehicle, the combination with a vehicle frame, of an axle, means yieldingly supporting said frame on said axle, steerable road wheel assemblies disposed adjacent opposite ends of the axle, steering knuckles supported for steering movement on said axle, and means supporting each wheel assembly for rising and falling movement on the associated knuckle, said means comprising a pair of laterally extending, vertically spaced links, each link having pivotal connection with the associated knuckle and wheel assembly, means acting between one link of each pair of links and the associated knuckle to limit rising and falling movement of the wheel assemblies with respect to the knuckle and axle, and a shock absorbing device carried by each knuckle and operatively connected between the knuckle and the associated links to damp movement of the latter.

3. In a motor vehicle, the combination with a vehicle frame, of axle means, means yieldingly supporting said frame on said axle means, road wheels disposed adjacent opposite ends of the axle means, means supporting each road wheel on said axle means for limited rising and falling movement with respect thereto, said last named means including a pair of links associated with each road wheel and having articulated connection with said axle means and wheel, and shock absorbing devices carried by said axle means, each shock absorbing device affording a fulcrum for and being operatively connected with one of the links of a pair.

4. In a motor vehicle, the combination with a vehicle frame, of axle means, means yieldingly supporting said frame on said axle means, road wheels disposed adjacent opposite ends of the axle means, means supporting each road wheel on said axle means for limited rising and falling movement with respect thereto, said last named means including a pair of laterally extending links associated with each road wheel and having pivotal connection with the latter and with the axle means about parallel substantially horizontal axes, a coil spring acting between said axle means and said links for yieldingly resisting upward movement of the latter, and shock absorbing devices carried by said axle means, each shock absorbing device affording a fulcrum for and being operatively connected with one of the links of a pair.

FRANK C. BEST.